(12) United States Patent
Nishimura et al.

(10) Patent No.: US 9,328,002 B2
(45) Date of Patent: May 3, 2016

(54) DISCHARGE UNIT

(71) Applicant: DAIKIN INDUSTRIES, LTD., Osaka-shi, Osaka (JP)

(72) Inventors: Masaya Nishimura, Shiga (JP); Kenkichi Kagawa, Osaka (JP); Tsunahiro Ohdou, Osaka (JP); Tomoki Saitou, Osaka (JP); Sachiko Yamaguchi, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 14/431,240

(22) PCT Filed: Sep. 24, 2013

(86) PCT No.: PCT/JP2013/005645
§ 371 (c)(1),
(2) Date: Mar. 25, 2015

(87) PCT Pub. No.: WO2014/050080
PCT Pub. Date: Apr. 3, 2014

(65) Prior Publication Data
US 2015/0239755 A1    Aug. 27, 2015

(30) Foreign Application Priority Data

Sep. 28, 2012  (JP) .................................. 2012-218349
Dec. 28, 2012  (JP) .................................. 2012-289124

(51) Int. Cl.
C02F 1/46    (2006.01)

(52) U.S. Cl.
CPC ................. *C02F 2201/46165* (2013.01); *C02F 2201/46175* (2013.01); *C02F 2303/04* (2013.01); *C02F 2305/023* (2013.01) *C02F 1/4608* (2013.01); *C02F 2201/46* (2013.01); *C02F 2201/4616* (2013.01); *C02F 2201/46135* (2013.01)
(Continued)

(58) Field of Classification Search
CPC ........... C02F 1/4608; C02F 2201/4616; C02F 2201/46135; C02F 2201/46165; C02F 2201/46175
See application file for complete search history.

(56) References Cited

U.S. PATENT DOCUMENTS

| | | | |
|---|---|---|---|
| 2008/0099406 A1* | 5/2008 | Ruan | A61L 2/02 204/554 |
| 2012/0048792 A1 | 3/2012 | Saitou et al. | |
| 2015/0114913 A1* | 4/2015 | Imai | C02F 1/4608 210/748.17 |

FOREIGN PATENT DOCUMENTS

| | | | | |
|---|---|---|---|---|
| CZ | WO 2009033436 A1 * | 3/2009 | | C02F 1/4608 |
| JP | 2000-93972 A | 4/2000 | | |
| JP | 2001-507274 A | 6/2001 | | |
| JP | 2005-81342 A | 3/2005 | | |
| JP | 2011-92920 A | 5/2011 | | |
| RU | WO 02098799 A1 * | 12/2002 | | B01J 10/002 |
| WO | WO 97/23285 A1 | 7/1997 | | |

OTHER PUBLICATIONS

International Search Report, issued in PCT/JP2013/005645, dated Dec. 10, 2013.

\* cited by examiner

*Primary Examiner* — Nicholas A Smith
(74) *Attorney, Agent, or Firm* — Birch, Stewart, Kolasch & Birch, LLP

(57) ABSTRACT

A discharge unit includes an alternating high-voltage generator, a pair of electrodes in water, the pair being configured to receive a voltage from the high-voltage generator, and an insulating divider configured to separate the pair of electrodes from each other in the water, and having a small discharge hole defining a path of current to flow between the pair of electrodes. The voltage is applied to the pair of electrodes to generate an electric discharge in the discharge hole.

4 Claims, 6 Drawing Sheets

DISCHARGE UNIT

TECHNICAL FIELD

The present invention relates to a discharge unit generating an electric discharge in water to purify the water.

BACKGROUND ART

Known discharge units for water treatment generate an electric discharge in water to purify the water. For example, Patent Document 1 discloses this type of discharge unit. The discharge unit of Patent Document 1 includes a pair of electrodes and an insulating divider. The pair of electrodes are provided in water and receives a predetermined voltage from a DC power source. The insulating divider separates the pair of electrodes from each other in the water, and has a through-hole defining a path of current to flow between the pair of electrodes. In this discharge unit, when a DC voltage is applied from the DC power source to the pair of electrodes, the density of current increases along the path of current of the through-hole of the divider to generate an electric discharge. The discharge produces bactericidal factors such as hydroxyl radicals in the water, thereby purifying the water.

CITATION LIST

Patent Document

PATENT DOCUMENT 1: Japanese Unexamined Patent Publication No. 2011-92920

SUMMARY OF THE INVENTION

Technical Problem

In the above-described discharge unit, the size of the through-hole of the divider, which defines a path of current, gradually increases, thereby reducing the electrical resistance of the through-hole and not providing the density of current needed for the discharge. This may hinder a stable discharge. That is, if a constant DC voltage is always applied to the pair of electrodes, a glow discharge may occur at a relatively high temperature in the through-hole. Discharge of heat generated by the glow discharge thermally breaks the through-hole to increase the hole size, which is a problem The present invention was made in view of the problems. In is an objective to reduce an increase in the size of the through-hole of the divider to stably generate discharges.

Solution to the Problem

According to a first aspect of the invention, a discharge unit includes an alternating power source (33), a pair of electrodes (31 and 32) in water, the pair being configured to receive a voltage from the power source (33), and an insulating divider (15) configured to separate the pair of electrodes (31 and 32) from each other in the water, and having a small through-hole (35) defining a path of current to flow between the pair of electrodes (31 and 32). The voltage is applied to the pair of electrodes (31 and 32) to generate an electric discharge in the through-hole (35).

According to the first aspect of the invention, the voltage is applied from the power source (33) to the pair of electrodes (31 and 32), thereby increasing the density of current in the through-hole (35), which defines a path of current to flow between the pair of electrodes (31 and 32). This generates the discharge. According to the present invention, since the power source (33) is of the alternating type, the polarity of the voltage applied to the pair of electrodes (31 and 32) alternates from positive to negative, or vice versa, at regular intervals. A spark discharge is thus generated in the through-hole (35) with no glow discharge generated. Specifically, in the case of a DC current, the form of the discharge changes from the spark discharge to the glow discharge with an increase in the current. On the other hand, according to the present invention, the polarity of the voltage applied to the pair of electrodes (31 and 32) alternates from positive to negative, or vice versa, before the form of the discharge changes to the glow discharge, thereby continuously generating the spark discharge in the through-hole (35). This prevents thermal destruction of the through-hole (35) caused by the glow discharge to reduce an increase in the size of the through-hole (35).

A second aspect of the invention is an embodiment of the first aspect of the invention in which a waveform of the voltage from the power source (33) has same positive and negative excursions in each period.

According to the second aspect of the invention, since the waveform of the voltage from the power source (33) has the same positive and negative excursions in each period, each electrode (31, 32) causes oxidation reaction and reduction reaction uniformly.

A third aspect of the invention is an embodiment of the first or second aspect of the invention in which the waveform of the voltage from the power source (33) is a square wave.

According to the third aspect of the invention, the waveform of the voltage is the square wave. Unlike a sine wave, for example, an electric discharge is generated without depending on the conductivity of the water.

A fourth aspect of the invention is an embodiment of any one of the first to third aspects of the invention in which one or both of ends (35a) of the through-hole (35) expand(s) outward to be inversely tapered.

When the voltage is applied from the power source (33) to the pair of electrodes (31 and 32), the density of current increases in the through-hole (35), which defines a path of current to flow between the pair of electrodes (31 and 32). This vaporizes the water to produce a bubble. The interface between the bubble and the water serves as an electrode to generate an electric discharge (i.e., a spark discharge) in the bubble. While the bubble in the through-hole (35) tries to rise, part of the bubble is caught by the inversely tapered surface of the end (35a), thereby preventing the bubble from rising in the present invention as shown in FIG. 7.

Advantages of the Invention

As described above, according to the present invention, since the power source (33) is of the alternating type, a spark discharge of a relatively low temperature is generated in the through-hole (35) with no glow discharge generated. This reduces an increase in the size of the through-hole (35), resulting in a highly stabilized discharge.

According to the second aspect of the invention, since the waveform of the voltage has the same positive and negative excursions in each period, the electrode (31, 32) causes oxidation reaction and reduction reaction uniformly. This reduces elution of the pair of electrodes (31 and 32) due to the oxidation reaction, resulting in a highly stabilized discharge.

According to the third aspect of the invention, the waveform of the voltage is the square wave. Unlike a sine wave, for example, an electric discharge is generated without depending on the conductivity of the water. This results in a highly stabilized discharge.

According to the fourth aspect of the invention, one or both of the ends (35a) of the through-hole (35) expand(s) outward to be inversely tapered. This configuration prevents the bubble, which is produced by application of a voltage to the pair of electrodes (31 and 32), from rising in the through-hole (35). Accordingly, the bubble in the through-hole (35) stays in the through-hole (35) for a long period. This results in more stable discharge operation.

DESCRIPTION OF EMBODIMENTS

An embodiment of the present invention will be described hereinafter with reference to the drawings. The following embodiment is a preferable example in nature, and is not intended to limit the scope, applications, and use of the present invention.

Figure 1:
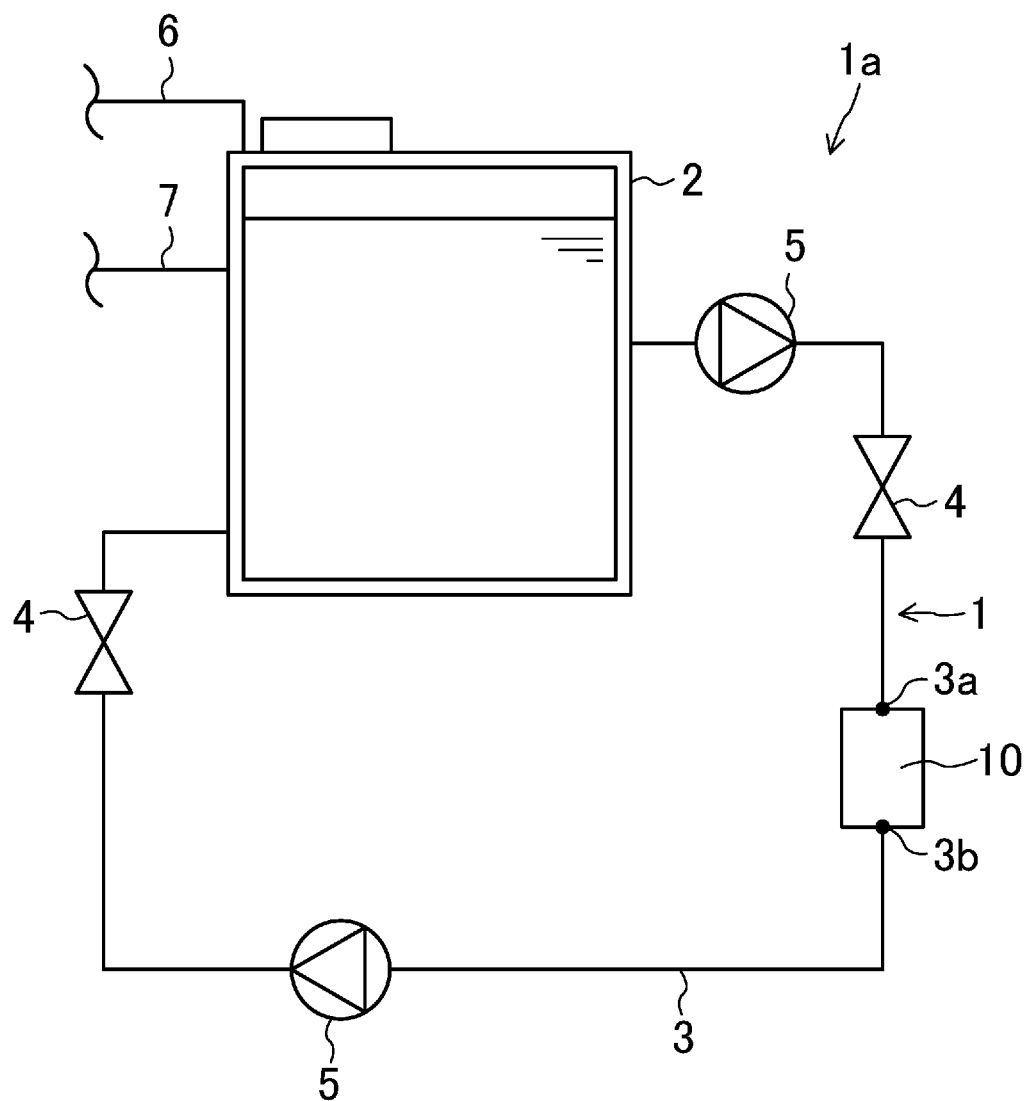
FIG. 1 is a diagram of a piping system illustrating a water tank and a water circulation circuit according to an embodiment.

As shown in FIG. 1, a water treatment system (I a) according to a first embodiment of the present invention includes a water circulation circuit (1) and a water tank (2).

The water tank (2) stores water (including hot water, the same hereinafter). The water tank (2) is connected to the water circulation circuit (1), a first channel pipe (6), and a second channel pipe (7).

The water circulation circuit (1) stirs and circulates the water in the water tank (2). In the water circulation circuit (1), a water pipe (3), two on-off valves (4 and 4), two pumps (5 and 5), and a water treatment unit (10) are connected together. The specific structure of the water treatment unit (10) will be described later.

The water circulates inside the water pipe (3). One end of the water pipe (3) is connected to the side surface of the water tank (2) on the left of the figure. The other end of the water pipe (3) is connected to the side surface of the water tank (2) on the right of the figure. The water pipe (3) is, at intermediate portions, connected to the two pumps (5 and 5), the two on-off valves (4 and 4), and the water treatment unit (10).

Each on-off valve (4, 4) is configured to open and close the passage of the water pipe (3). One of the two on-off valves (4 and 4) is provided at the inflow side of the water treatment unit (10). The other one is provided at the outflow side of the water treatment unit (10). One of the two pumps (5 and 5) is provided between the on-off valve (4) at the inflow side of the treatment unit (10) and the water tank (2). The other one is provided between the water treatment unit (10) and the on-off valve (4) at the outflow side of the treatment unit (10). When the on-off valve (4, 4) opens, the water circulates inside the water pipe (3). When the on-off valve (4, 4) closes, the water in the water pipe (3) stops circulating.

Structure of Water Treatment Unit

Figure 2:
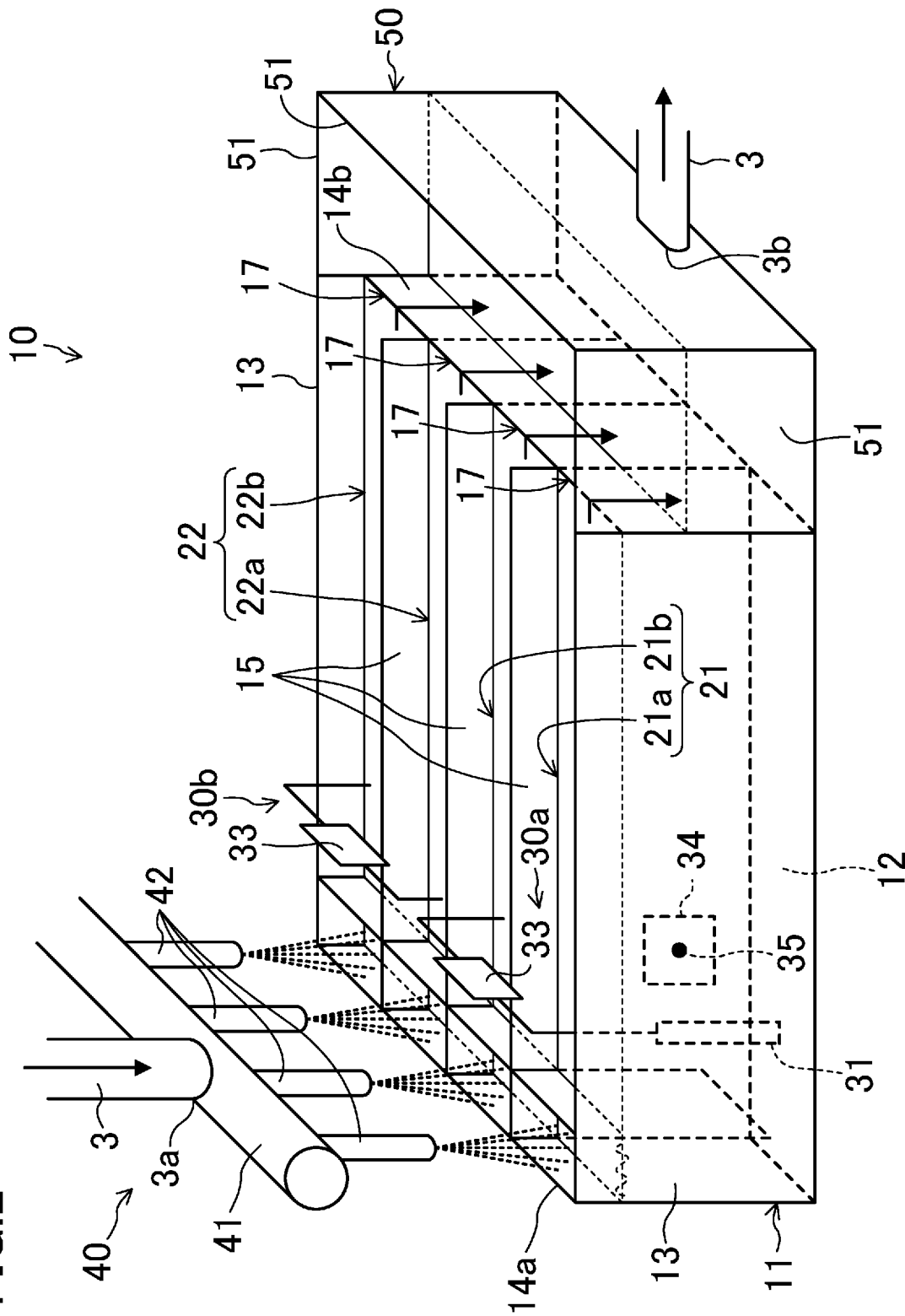
FIG. 2 illustrates a water treatment unit according to the embodiment.
Figure 3:
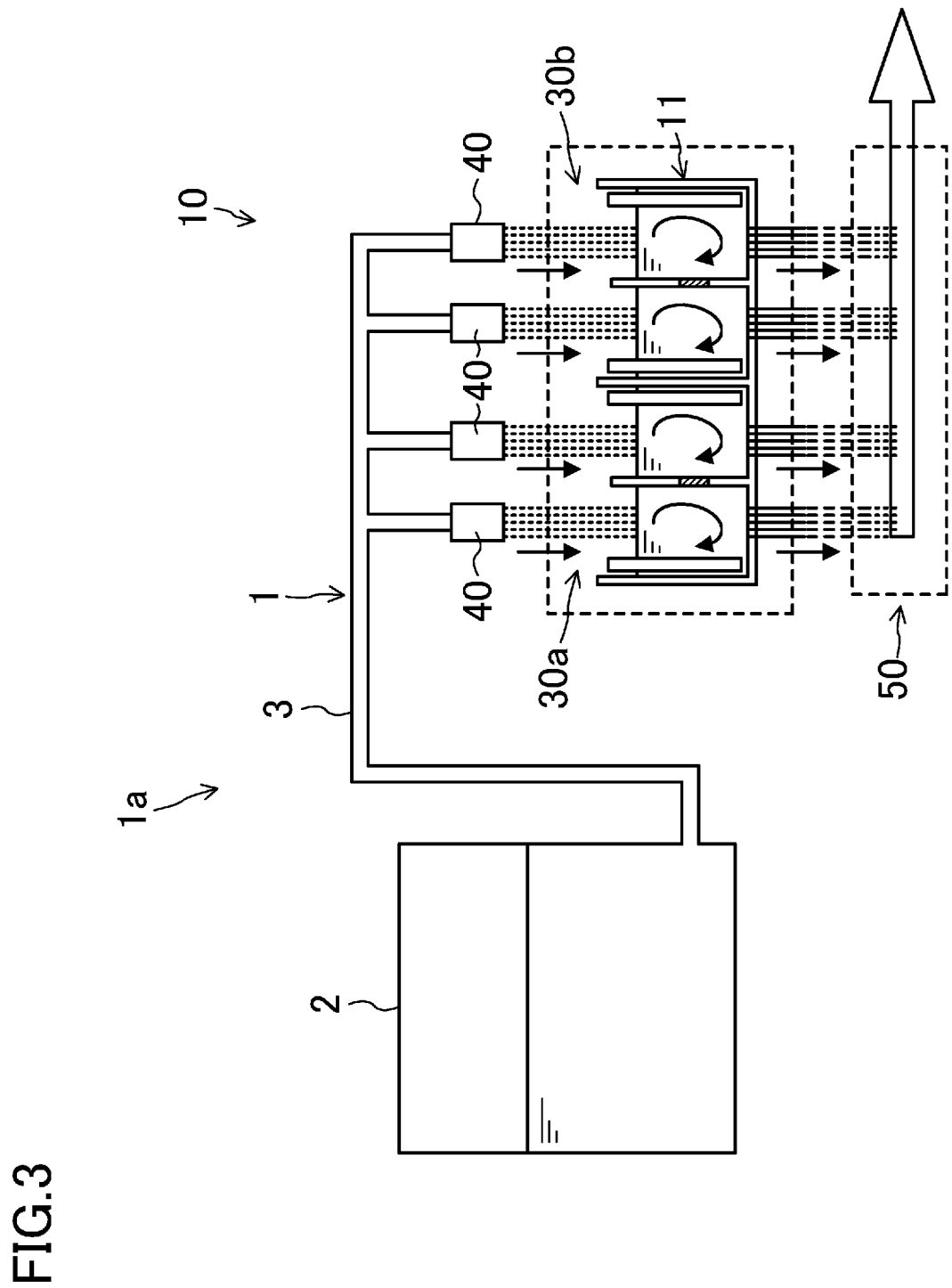
FIG. 3 schematically illustrates the water treatment unit according to the embodiment.

As shown in FIGS. 2 and 3, the water treatment unit (10) purifies the water flowing from an inlet (3a) of the water pipe (3) and allows the purified water to flow out of an outlet (3b) of the water pipe (3). This water treatment unit (10) includes a spray apparatus (40), a treatment vessel (11), a downstream vessel (50), and a plurality of discharge units (30a and 30b). The water treatment unit (10) supplies the water flowing from the water pipe (3) from the spray apparatus (40) to the treatment vessel (11), and purifies the water in the treatment vessel (11) using bactericidal factors produced in the discharge unit (30a, 30b). Then, the water treatment unit (10) supplies the purified water to the downstream vessel (50), and allows the purified water to flow from the downstream vessel (50) to the water pipe (3).

The treatment vessel (11) is a box-like water vessel formed in a substantially rectangular shape as viewed from above. Specifically, the treatment vessel (11) includes a bottom (12), long walls (13 and 13), and short walls (14a and 14b). The bottom (12) is a flat plate formed in a substantially rectangular shape as viewed from above. Each long wall (13, 13) is a flat plate formed in a horizontally elongated, substantially rectangular shape, and standing upward from one of the long sides of the bottom (12). Each short wall (14a, 14b) is a flat plate formed in a vertically elongated, substantially rectangular shape, and standing upward one of the short sides of the bottom (12). As compared to the short wall (14a) of the treatment vessel (11) at one longitudinal end (i.e., the inflow side) and the long walls (13 and 13), the short wall (14b) of the treatment vessel (11) at the other longitudinal end (i.e., the outflow side) is formed low, thereby providing outlets (17).

Inside the treatment vessel (11), a plurality of dividers (15) are arranged in the width direction at predetermined intervals. Each divider (15) is a flat plate formed in a substantially rectangular shape, which is laterally long. The dividers (15) are arranged along the length of the treatment vessel (11) to divide the inside of the treatment vessel (11) into a plurality of lanes (21a-22b). The dividers (15) are made of an electrically insulating material. A hole (16) is cut in the divider (15, ..., 15) in each of a first path (21) and a second path (22), which will be described later. The hole (16) penetrates the associated divider (15, ..., 15) in the thickness direction. In the treatment vessel (11), the dividers (15) form first to fourth lanes (21a-22b) arranged in this order from the bottom of the paper of FIG. 2. The number of the lanes (21a-22b) formed in the treatment vessel (11) is a mere example and may be changed as appropriate in accordance with the amount of the water purified by the water treatment unit (10). The divider (15) serves as the dividing member according to the present invention.

Out of the lanes (21a-22b), the pair of the first and second lanes (21a and 21b) forms the first path (21), and the pair of the third and fourth lanes (22a and 22b) forms the second path (22).

Figure 4:
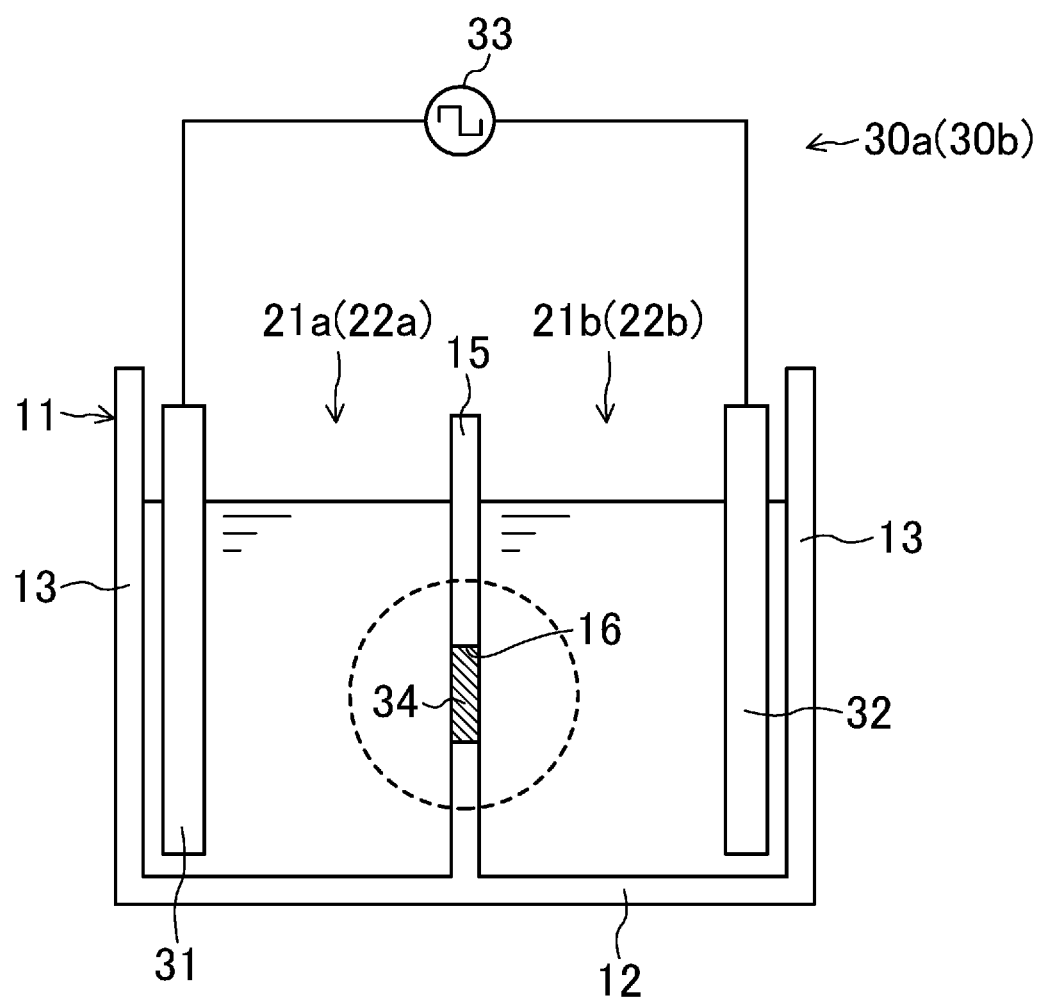
FIG. 4 is a schematic cross-sectional view illustrating a discharge unit according to the embodiment.

As shown in FIG. 4, the plurality of discharge units (30a and 30b) includes a first discharge unit (30a) and a second discharge unit (30b). Each discharge unit (30a, 30b) is provided for one of the above-described pairs of lanes (21a and 21b, 22a and 22b).

The first discharge unit (30a) purifies the water in the first path (21). The first discharge unit (30a) includes a pair of electrodes (31 and 32), a high-voltage generator (33), and the divider (15) with the above-described hole (16). The high-voltage generator (33) is connected to the pair of electrodes (31 and 32) and applies a predetermined voltage to the pair of electrodes (31 and 32). The divider (15) includes a discharge member (34). The second discharge unit (30b) purifies the water in the second path (22). The specific structure of the second discharge unit (30b) is similar to that of the first discharge unit (30a), and the explanation thereof will be omitted.

The pair of electrodes (31 and 32) generates a discharge in water, and includes a hot-side electrode (31) and a neutral-side electrode (32). The electrode (31) is a flat plate placed in the first lane (21a). The electrode (31) is connected to the high-voltage generator (33). The electrode (32) is a flat plate placed in the second lane (21b). The electrode (32) is connected to the high-voltage generator (33). The electrode (31) is substantially parallel to the electrode (32). The electrodes (31 and 32) are made of, for example, a metal material which is highly resistant to corrosion.

Figure 5:
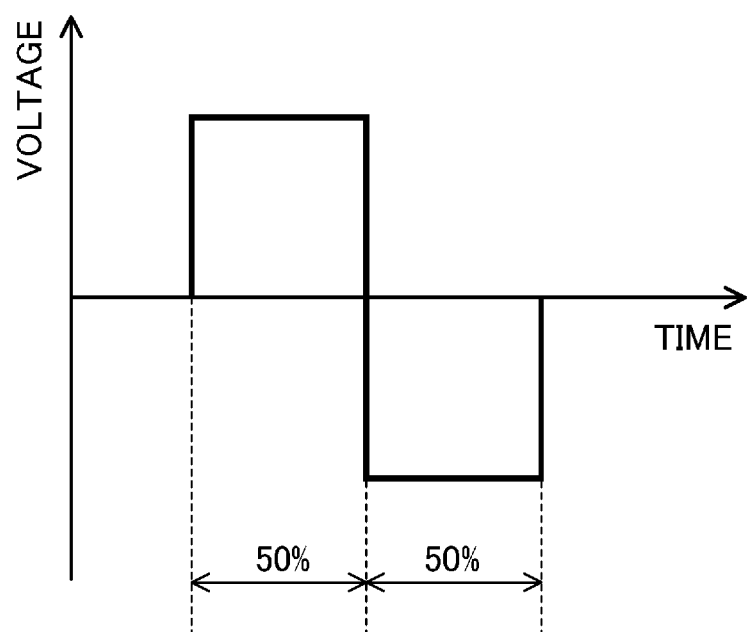
FIG. 5 illustrates the waveform of a voltage according to the embodiment.

The high-voltage generator (33) is a power source applying a predetermined voltage to the pair of electrodes (31 and 32). In this embodiment, an example will be described where the high-voltage generator (33) applies a voltage with an alternating waveform, which alternates between positive and negative values, to the pair of electrodes (31 and 32) as shown in FIG. 5. The duty of the alternating waveform (a square wave) is controlled to have the same positive and negative excursions. The voltage applied to the pair of electrodes (31 and 32) is a mere example. The waveform does not have to be the square wave and may be a sine wave as long as the voltage is an alternating voltage.

Figure 6:
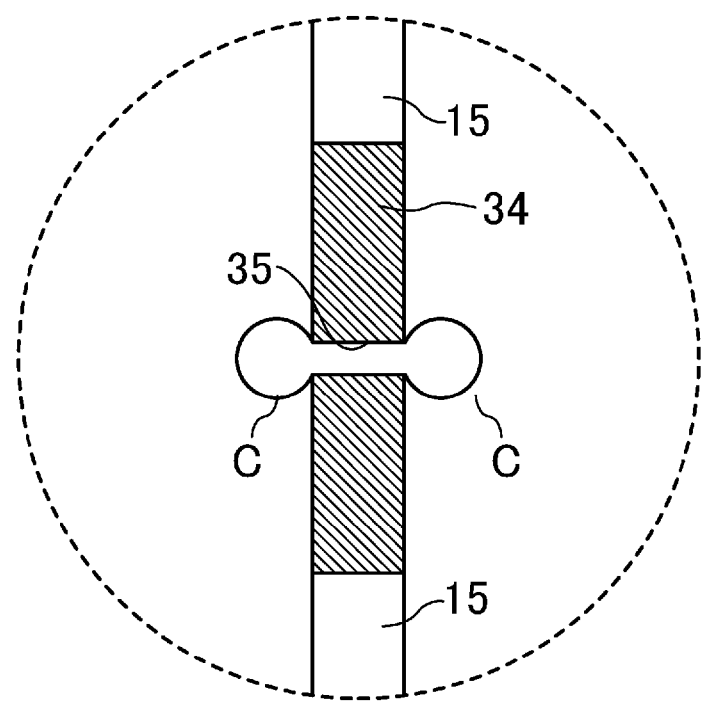
FIG. 6 is a partial enlarged view of the discharge unit according to the embodiment.

The discharge member (34) is a plate-like insulating member. The discharge member (34) is made of an electrically insulating material such as a ceramic material. The ceramic material includes aluminum nitride, silicon nitride, or alumina. The discharge member (34) closes the hole (16) of the divider (15) separating the first lane (21a) and the second lane (21b). A small discharge hole (35) is cut almost in the center of the discharge member (34). The discharge hole (35) is designed to have, for example, an electrical resistance of several MΩ. The discharge hole (35) defines a path of current to flow between the electrode (31) and the electrode (32). The discharge hole (35) described above serves as a density of current concentrator, which increases the density of current in the path of current to flow between the pair of electrodes (31 and 32). As shown in FIG. 6, when a voltage is applied to the electrode (31) and the electrode (32), the density of current in the path of current increases such that Joule heat vaporizes the water in the discharge hole (35) of the discharge member (34) to produce bubbles (C). Then, the electrodes (31 and 32) and the water are at the same potential, and the interface between each bubble (C) and the water serves as an electrode to generate an electric discharge (i.e., a spark discharge). That is, in this discharge, since the electrode (31) and the electrode (32) do not serve as the discharge electrodes, the electrodes (31 and 32) are less degraded by the discharge.

The spray apparatus (40) is connected to the water pipe (3), and sprays the water flowing from the inlet (3a) of the water pipe (3) to supply the water to the treatment vessel (11). The spray apparatus (40) serves as the insulator according to the present invention. The spray apparatus (40) includes a nozzle header (41), and a plurality of spray nozzles (42) provided for the respective lanes (21a-22b).

The nozzle header (41) is an elongated pipe. The nozzle header (41) is, at the side surface, connected to the water pipe (3), and divides the water from the water pipe (3) into the spray nozzles (42).

The plurality of spray nozzles (42) are provided at predetermined intervals in the longitudinal direction of the nozzle header (41). Each of the spray nozzles (42) is provided for an associated one of the lanes (21a-22b). The water flowing through the water pipe (3) flows from the inlet (3a) to the nozzle header (41), and is sprayed as particles (or droplets) from the spray nozzles (42) to the associated lanes (21a-22b). At this time, since the water sprayed from the spray nozzles (42) become the particles (or the droplets), air is interposed between the particles (or between the droplets) to increase the electrical resistance. This electrically insulates the water flowing from the inlet (3a) of the water pipe (3) from the water flowing through the treatment vessel (11). The spraying with the spray nozzles (42) generates an electrical resistance of hundreds of MΩ or more between the water at the inlet (3a) of the water pipe (3) and the water in the treatment vessel (11).

The downstream vessel (50) is a water vessel provided at the outflow side of the treatment vessel (11). The water flows down from the treatment vessel (11) and flows as drops into the downstream vessel (50). The downstream vessel (50) is a box in a substantially rectangular shape as viewed from above, and includes outer walls (51). The outer walls (51) of the downstream vessel (50) has the same height as the long wall (13) and the inflow-side short wall (14a) of the treatment vessel (11). The downstream vessel (50) is connected to the outlet (3b) of the water pipe (3). The outflow-side short wall (14b) of the treatment vessel (11) separates the downstream vessel (50) from the treatment vessel (11). Since the short wall (14b) includes the outlets (17), the water stored in the treatment vessel (11) energetically flows down like a fall from the outlets (17) toward the bottom of the downstream vessel (50) before the treatment vessel (11) is filled up. There is a predetermined height between the outlets (17) and the bottom of the downstream vessel (50) or the surface of the water stored in the downstream vessel (50). Thus, the water in the treatment vessel (11) becomes drops when flowing down from the outlets (17) to the downstream vessel (50). The water flowing down to the downstream vessel (50) become the drops (i.e., the particles or the droplets), thereby interposing the air between the particles (or between the droplets) to increase the electrical resistance. This electrically insulates the water stored in the treatment vessel (11) from the water flowing through the downstream vessel (50). The electrical resistance between the treatment vessel (11) and the downstream vessel (50) is hundreds of MΩ or more. After that, the water flowing through the downstream vessel (50) flows out of the outlet (3b) of the water pipe (3). The water flowing down from the outlets (17) flows, as the particles, into the downstream vessel (50), which serves as the insulator according to the present invention.

Operation

In the water treatment system (1a) according to this embodiment, the water treatment unit (10) treats the water flowing through the water pipe (3).

Before the water treatment unit (10) starts operating, the on-off valves (4 and 4) of the water circulation circuit (1) open so that the water in the water tank (2) flows through the water pipe (3). The water flowing through the water pipe (3) flows from the inlet (3a) via a pump (5) into the nozzle header (41) and is sprayed from the spray nozzles (42) to the lanes (21a-22b). Then, the water is stored in the treatment vessel (11). At this time, since the sprayed water is the particles (or the droplets), the air is interposed between the particles (or between the droplets) to increase the electrical resistance. This electrically insulates the water flowing from the inlet (3a) of the water pipe (3) from the water flowing through the treatment vessel (11).

At the start of the operation of the water treatment unit (10), the treatment vessel (11) contains water. The high-voltage generator (33) applies to the pair of electrodes (31 and 32), a voltage with a square wave having the same positive and negative excursions. This increases the density of current in the path of current of the discharge hole (35) of the discharge member (34).

When the density of current in the path of current of the discharge hole (35) increases, the Joule heat inside the discharge hole (35) increases. As a result, the vaporization of the water progresses to produce the bubbles (C) in the vapor phase inside and near the inlet and outlet of the discharge hole (35) of the discharge member (34). As shown in FIG. 6, each bubble (C) entirely covers the end of the discharge hole (35). In this state, the bubbles (C) function as the resistor hindering the electrical conduction between the electrode (31) and the electrode (32) through the water. There is then almost no potential difference between each electrode (31, 32) and the water, and the interface between each bubble (C) and the water serves as an electrode. This causes dielectric breakdown inside the bubble (C) to generate an electric discharge (i.e., a spark discharge).

As described above, when an electric discharge is generated in the bubble (C), bactericidal factors (e.g., active species such as hydroxyl radicals) are generated in the water in the treatment vessel (11). Hydroxyl radicals are the bactericidal factors according to the present invention.

After that, the water flowing through the lanes (21a-22b) of the treatment vessel (11) flows down from the outlets (17) to the downstream vessel (50). At this time, the water flowing down from the outlets (17) to the downstream vessel (50) becomes drops, thereby interposing the air between the particles (or between the droplets) to increase the electrical resistance. This electrically insulates the water stored in the treatment vessel (11) from the water flowing through the downstream vessel (50).

Advantages of Embodiment

According to the embodiment, since the high-voltage generator (33) is of the alternating type, the polarity of the voltage applied to the pair of electrodes (31 and 32) alternates from positive to negative, or vice versa, at regular intervals. Thus, in the discharge hole (35), the spark discharge is generated with no glow discharge generated. Specifically, in the case of the DC current, the form of the discharge changes from a spark discharge to a glow discharge with an increase in the current. In this embodiment, however, since the polarity of the voltage applied to the pair of electrodes (31 and 32) alternates from positive to negative, or vice versa, before the form of the discharge changes to the glow discharge, the spark discharge is continuously generated in the discharge hole (35) with no glow discharge generated. This prevents thermal destruction in the discharge hole (35), which is caused by a glow discharge, to reduce an increase in the size of the discharge hole (35). This results in a highly stabilized discharge.

In the embodiment, the waveform of the voltage has the same positive and negative excursions. Each electrode (31, 32) causes oxidation reaction and reduction reaction uniformly. This reduces elution of metal from the electrodes (31 and 32) due to the oxidation reaction. This results in a highly stabilized discharge.

In the embodiment, the waveform of the voltage is a square wave. Unlike a sine wave, for example, an electric discharge is generated without depending on the conductivity of the water. This results in a highly stabilized discharge.

In the embodiment, since the water flowing between the water pipe (3) and the treatment vessel (11) drops down, the air is interposed between the particles (or between the droplets) of the water to increase the electrical resistance. This electrically insulates the water flowing through the water pipe (3) from the water flowing through the treatment vessel (11).

Since the spray apparatus (40) is provided, the water flowing through the water pipe (3) is sprayed and supplied to the treatment vessel (11). The air is thus interposed between the particles (or between the droplets) of the water to increase the electrical resistance. This electrically insulates the water flowing through the water pipe (3) from the water flowing through the treatment vessel (11).

Furthermore, the downstream vessel (50) is provided at the outflow side of the treatment vessel (11) to store the water, which has been stored in the treatment vessel (11) and flows down as drops. Thus, the water stored in the treatment vessel (11) flows down as the drops to be supplied to the downstream vessel (50). The air is then interposed between the particles (or between the droplets) of the water to increase the electrical resistance. This electrically insulates the water stored in the treatment vessel (11) from the water flowing through the water passage (3) at the outflow side of the downstream vessel (50).

Since the polarity of the voltage applied to the pair of electrodes (31 and 32) alternates from positive to negative, or vice versa, at regular intervals, deposition of metal, etc., from the electrode (31, 32) is reduced.

Since the first to fourth lanes (21a-22b) are provided, the amount of the water treated by the water treatment system (1a) is controlled in accordance with the number of the lanes (21a-22b).

Figure 7:
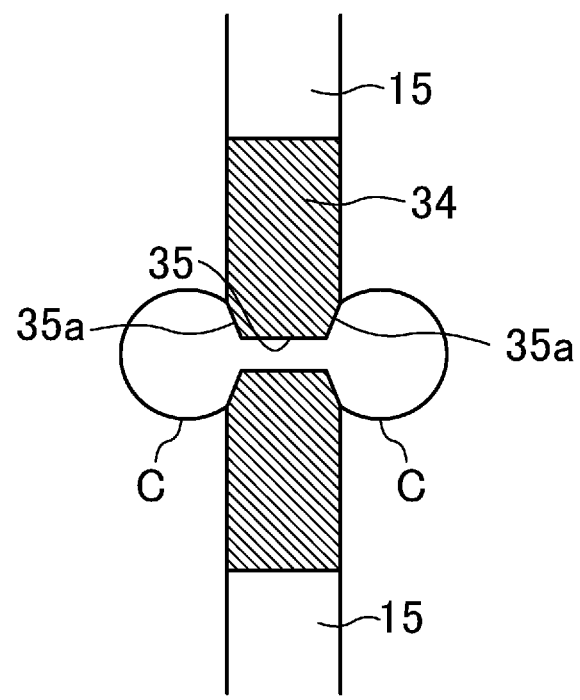
FIG. 7 is a partial enlarged view of the discharge unit according to the embodiment.

In the embodiment, the discharge hole (35) of the discharge member (34) may be in the shape shown in FIG. 7. Specifically, the discharge hole (35) of FIG. 7 is inversely tapered such that each both end (35a) expands outward. While each bubble (C) in the discharge hole (35) tries to rise, part of the bubble (C) is caught by the inversely tapered surface of the end (35a) to prevent the bubble (C) from rising in the form of FIG. 7. That is, the bubble (C) in the discharge hole (35) stays in the discharge hole (35) for a long period. As a result, a more stable discharge is generated. Alternatively, both the ends of the discharge hole (35) does not have to be inversely tapered, and only one end (35a) may be inversely tapered.

INDUSTRIAL APPLICABILITY

As described above, the present invention is used effectively as a discharge unit including a pair of electrodes in water.

DESCRIPTION OF REFERENCE CHARACTERS

15 Divider
31 Electrode (Hot Side)
32 Electrode (Neutral Side)
33 High-Voltage Generator (Power Source)
35 Discharge Hole (Through-Hole)

The invention claimed is:
1. A discharge unit comprising:
an alternating power source;
a pair of electrodes in water, the pair being configured to receive a voltage from the power source; and
an insulating divider configured to separate the pair of electrodes from each other in the water, and having a small through-hole defining a path of current to flow between the pair of electrodes, wherein
the voltage is applied to the pair of electrodes to generate an electric discharge in a bubble produced in the through-hole, and
the power source alternately changes a polarity of the voltage applied to the pair of electrodes at predetermined intervals such that the polarity alternates before a form of the discharge generated in the bubble changes from spark discharge to glow discharge.

2. The discharge unit of claim 1, wherein a waveform of the voltage from the power source has same positive and negative excursions in each period.

3. The discharge unit of claim 1, wherein the waveform of the voltage from the power source is a square wave.

4. The discharge unit of claim 2, wherein the waveform of the voltage from the power source is a square wave.

* * * * *